United States Patent [19]
Hokama

[11] 3,803,079
[45] Apr. 9, 1974

[54] COPOLYMERS OF ALPHA-METHYLSTYRENE AND VINYLTOLUENE AND PROCESS FOR THEIR PREPARATION

[75] Inventor: Takeo Hokama, Chicago, Ill.

[73] Assignee: Velsicol Chemical Corporation, Chicago, Ill.

[22] Filed: June 12, 1972

[21] Appl. No.: 261,825

[52] U.S. Cl..... 260/33.6 UA, 260/88.2 C, 260/95 R
[51] Int. Cl....... C08f 1/72, C08f 19/02, C08f 41/02
[58] Field of Search...... 260/88.2 C, 33.6 UA, 95 R

[56] References Cited
UNITED STATES PATENTS
| | | | |
|---|---|---|---|
| 3,000,868 | 9/1961 | Powers | 260/88.2 C |
| 3,052,664 | 9/1962 | Cleland et al. | 260/88.2 C |
| 3,640,981 | 2/1972 | Davis | 260/88.2 C |

Primary Examiner—Morris Liebman
Assistant Examiner—T. DeBenedictis, Sr.
Attorney, Agent, or Firm—Robert J. Schwarz; Dietmar H. Olesch

[57] ABSTRACT

This invention discloses a thermoplastic hydrocarbon resin having a ring and ball softening point of from about 275° to about 350° F and a number average molecular weight of from about 1,500 to about 3,000 comprising a blend of alpha-methylstyrene and vinyltoluene copolymers wherein about 45 to 60 weight percent of said blend consists of a copolymer having an alpha-methylstyrene to vinyltoluene weight ratio of from about 70:30 to about 90:10, and a number average molecular weight above about 4000, wherein about 30 to 60 weight percent of said blend consists of a copolymer having an alpha-methylstyrene to vinyltoluene weight ratio of from about 40:60 to about 60:40, and a number average molecular weight below about 2000 and wherein the total blend contains from about 50 to about 90 weight percent alpha-methylstyrene and from about 10 to about 50 weight percent vinyltoluene; and further discloses a process for the preparation of said resin which comprises continuously polymerizing a monomer mixture containing from about 50 to about 90 weight percent alpha-methylstyrene and from about 10 to about 50 weight percent vinyltoluene dissolved in an inert organic reaction medium at a concentration of from about 5 to about 20 weight percent, which has been precooled to a temperature between about 0° and about −50°C in the presence of a catalytic amount of water and a Friedel-Crafts halide at atmospheric pressure and adiabatic conditions.

12 Claims, No Drawings

COPOLYMERS OF ALPHA-METHYLSTYRENE AND VINYLTOLUENE AND PROCESS FOR THEIR PREPARATION

This invention relates to new linear thermoplastic hydrocarbon resins of alpha-methylstyrene and vinyltoluene which are obtained from a novel polymerization procedure of a mixture of the monomers. The copolymers of the present invention are useful for a variety of purposes, particularly as binders in printing inks. Other uses are overprint varnishes, lacquers and other coating applications, mastics, contact adhesives, modifying resins for hot melt adhesives and the like.

Copolymers of alpha-methylstyrene and vinyltoluene which are known in the art are random copolymers. That is the individual monomer units are distributed throughout the backbone of the polymer in a random manner. The prior art copolymers of alpha-methylstyrene and vinyltoluene are also of a mononodal type. That is their molecular weight distribution curve wherein molecular weight is plotted against polymer content exhibits a single bell shaped configuration. The mononodal copolymers can be contrasted to binodal copolymers of which the molecular weight distribution curve has the appearance of two partially overlapping bell shaped curves. Furthermore, the prior art mononodal copolymers have a substantially uniform monomer ratio throughout their molecular weight range.

The properties of the random mononodal copolymers having a substantially uniform monomer ratio throughout their molecular weight range are significantly different from those of the binodal copolymers of the present invention. The prior art copolymers exhibit inferior film properties when compared to the copolymers of this invention having a binodal molecular weight distribution and different monomer ratios within the high and low molecular weight fractions. The superior film characteristics of binodal copolymers is due to the more distinct high and low molecular weight fraction of the copolymer. The high molecular weight fraction imparts hardness and toughness while the low molecular weight fraction acts as a plasticizer and imparts flexibility and workability to the polymer. Furthermore, the high molecular weight fraction is substantially richer in alpha-methylstyrene content than the lower molecular weight fraction.

It has now been found that essentially linear binodal copolymers of alpha-methylstyrene and vinyltoluene can be prepared by a novel process as hereinafter described. Moreover, the copolymers of this invention having particular monomer ratios within the high and low molecular weight fractions, relatively high molecular weights as well as high ring and ball softening points are especially suitable as printing ink binders.

More specifically, one embodiment of the present invention resides in a thermoplastic hydrocarbon resin having a ring and ball softening point of from about 275° to about 350° F and a number average molecular weight of from about 1,500 to about 3,000 comprising a blend of alpha-methylstyrene and vinyltoluene copolymers wherein about 45 to 60 weight percent of said blend consists of a copolymer having an alpha-methylstyrene to vinyltoluene weight ratio of from about 70:30 to about 90:10 and a number average molecular weight above about 4,000, wherein about 30 to 60 weight percent of said blend consists of a copolymer having an alpha-methylstyrene to vinyltoluene weight ratio of from about 40:60 to about 60:40 and a number average molecular weight below about 2,000, and wherein the total blend contains from about 50 to about 90 weight percent alpha-methylstyrene and from about 10 to about 50 weight percent vinyltoluene.

In a preferred embodiment of this invention the total blend contains from about 60 to about 80 weight percent alpha-methylstyrene and from about 20 to about 40 weight percent vinyltoluene, has a number average molecular weight of from about 2,000 to about 3,000 and a ring and ball softening point of from about 300° to about 350° F.

The significance of the number average molecular weight term and the method of its determination is described in Structure of Polymers, M. I. Miller, Reinhold, New York, 1966. The ring and ball softening point referred to herein is determined by the standard A.S.T.M. Method E 28.

The thermoplastic hydrocarbon resins having the above described characteristics can be prepared in a manner heretofore unknown, by the process of this invention. It has now been found that the described resins of this invention can be prepared by a continuous process in exceedingly short reaction times. Polymers having a number average molecular weight of from 1,500 to 3,000 can hereby be prepared continuously utilizing polymerization times ranging between about 10 seconds and about 2 minutes. These short reaction times result in a process whereby large quantities of the desired products can be prepared while utilizing modest reaction equipment of limited size.

It has also been found that the described resins can be prepared at atmospheric pressure while still maintaining the short reaction times. The use of atmospheric reaction conditions further simplifies the reaction equipment which can be used for the present process and eliminates the dangers and difficulties which normally accompany high pressure operations.

More significantly, it has been found that the resins of the present invention can be prepared via a substantially adiabatic process. Such a process has many advantages over an isothermal process due to the low temperatures required for the polymerization of alpha-methylstyrene and vinyltoluene and the highly exothermic nature of the process. Thus, the present process does not require the removal of heat of polymerization from the reaction site but can be carried out by merely precooling the feed stream to the required temperature. Surprisingly, this procedure does not result in the formation of large quantities of dimers and trimers as would be expected. The precooling temperatures to which the feed stream of this process must be subjected are no more severe than would be required in many isothermal processes, and in many instances can be higher, such as temperatures ranging up to about 0° C.

The continuous polymerization of alpha-methylstyrene and vinyltoluene via the process of the present invention is carried out in relatively dilute solutions of the monomers in an inert organic solvent. A wide variety of solvents can be used, their only requirements being inertness to the polymerization conditions and the ability to dissolve the monomers and the copolymer which is produced at the relatively low temperatures of the process. Solvents which meet these requirements and which are particularly suitable for the process of this invention are aromatic hydrocarbons.

The process of this invention also utilizes a polymerization catalyst which is dispersed or dissolved in the feed stream. Friedel-Crafts halides are the catalysts, which are generally suitable in effecting the process, but the catalysts which are most suitable and preferred are those selected from the group consisting of boron trifluoride, aluminum chloride, ethyl aluminum dichloride, diethylaluminum chloride and mixtures thereof. Small amounts of water which act as a cocatalyst must be present in the reaction mixture to make the above listed catalysts effective.

In its broadest scope the process of this invention comprises the polymerization at atmospheric pressures and adiabatic conditions of a dilute feed stream of alpha-methylstyrene containing a suitable catalyst and small amounts of water which has been precooled to a temperature sufficiently low so as to minimize the formation of dimers and trimers. To make this process operative the various steps and procedures must be performed within certain specific limits.

Of particular importance in the process of this invention are the limitations of the monomer concentration in the feed stream entering the polymerization reactor and the temperature of the feed stream. Generally, to obtain the alpha-methylstyrene vinyltoluene resins heretofore described the total monomer concentration in the feed stream must be maintained below about 30 percent by weight of the total feed stream and preferably is maintained at a concentration ranging between about 5 percent and about 20 percent by weight of the feed stream. The lower concentrations of monomers in the feed stream results in a product of higher molecular weight and softening point and also results in lesser dimer and trimer formation. The higher monomer concentrations in the feed stream will result in lower molecular weight and softening point products which contain a greater proportion of undesirable dimers and trimers.

Since the process of the present invention is an adiabatic one, the temperature at which the feed stream enters the reactor controls the polymerization temperatures at which the product is actually prepared. It has been found that the feed stream must be precooled to at least 0° C and generally to a temperature ranging between about −50° C and about 0° C in order to obtain the copolymers of the present invention. The lower temperatures such as those ranging between about −50° C and about −20° C result in resins having higher molecular weights and softening points, while the higher temperatures such as those ranging between about −20° C to about 0° C result in products of lower molecular weight and softening point.

In actual practice the simultaneous effect of both the initial temperature of the feed stream and the monomer concentration in the feed stream must be considered. For example, the average molecular weight of the product can be kept the same over a certain range of one of the parameters by counteracting its effect with the other parameter. However, while the average molecular weight may stay about the same, the molecular weight distribution of the resulting polymer will vary and the physical properties will change accordingly. This aspect of the process of the present invention can be put to use in producing resins which can be tailored to a specific application. Furthermore, by varying both the temperature and monomer concentration in the same direction in terms of their effect on polymerization product, the additive effect can be utilized to prepare polymers having properties at the extreme ranges heretofore described.

The concentration of alpha-methylstyrene and vinyltoluene monomers in the feed stream can be maintained through various means. One method comprises simply co-mixing the alpha-methylstyrene vinyltoluene mixture and the inert organic solvent in the proportions required by the process of this invention. A preferred method of maintaining the required monomer concentration in the feed stream, however, comprises comixing the alpha-methylstyrene and vinyltoluene with the inert organic solvent such that a solution of the monomers ranging between about 30 and 60 percent by weight is obtained, and thereafter recycling a sufficient amount of the polymerization effluent, comprising polymer and inert solvent into the feed stream such that the monomer concentration is lowered to between about 5 and about 20 percent by weight of the total mixture. This is a preferred method since it requires lesser amount of solvent and facilitates the removal of polymer from the remaining effluent.

The above enumerated advantages and requirements are realized by a process for the production of alpha-methylstyrene vinyltoluene polymer which comprises continuously polymerizing a monomer mixture containing from about 50 to about 90 weight percent alpha-methylstyrene and from about 10 to about 50 weight percent vinyltoluene dissolved in an inert organic reaction medium at a concentration of from about 5 to about 20 weight percent, which has been precooled to a temperature between about 0° and about −50° C in the presence of a catalytic amount of water and a Friedel-Crafts halide at atmospheric pressure and substantially adiabatic conditions.

As indicated, a preferred mode of carrying out the present process comprises utilizing part of the polymerization product solution as the inert reaction medium. Thus, another embodiment of the present invention resides in a process which comprises a. cooling a feed stream comprising a monomer mixture consisting of from about 50 to 90 weight percent alpha-methylstyrene and from about 10 to about 50 weight percent vinyltoluene dissolved in an aromatic hydrocarbon solvent at a concentration of from about 30 to about 60 percent by weight and from about 20 to about 100 ppm of water based on a monomer mixture to a temperature of from about 0°C to about −50° C, b. continuously flowing said feed stream through a mixing jet into a pipeline reactor and polymerizing the monomer mixture at atmospheric pressure and adiabatic conditions and c. recycling a sufficient amount of the effluent from the pipeline reactor after cooling it to a temperature ranging from about 0°C to about −50° C to the mixing chamber such that the alpha-methylstyrene vinyltoluene concentration in the mixture entering the pipeline reactor ranges between about 5 and about 20 percent by weight of the total mixture while simultaneously adding a catalyst selected from the group consisting of boron trifluoride, aluminum chloride, ethyl aluminum dichloride, diethyl aluminum chloride and mixtures thereof to the recycling effluent in an amount of from about 0.05 to about 2.0 percent by weight based on the monomer mixture in the feed stream.

The process of the present invention can be carried out in a pipeline reactor of sufficient length such that it provides for a residence time for the reactants which ranges from about 15 seconds to about 2 minutes. The diameter of the pipe can vary with the rate of flow of the feed stream. Larger diameters require higher flow rates to prevent backmixing and provide uniform polymerization conditions, while lower flow rates can be used with a smaller diameter pipe.

When the preferred process of this invention, wherein part of the polymerization effluent is recycled for the purpose of controlling the monomer concentration in the feed stream is employed, the entry to the pipeline reactor is equipped with a mixing jet. This jet provides for a rapid and thorough blending of the monomer solution of alpha-methylstyrene and vinyltoluene in the inert organic solvent and the recycled reactor effluent.

The reactor effluent consisting substantially of polymer solution in organic solvent is directed into a suitable level control vessel whereby, in conjunction with an orifice flow control instrument, the proportion of effluent which is recycled can be controlled as required to control the monomer concentration. As previously indicated the recycled reactor effluent as well as the alpha-methylstyrene vinyltoluene monomer solution must be precooled before entering the mixing jet. This can be accomplished with standard heat exchange equipment of sufficient capacity to enable the cooling of these streams to temperatures of about −50° C. Freon evaporators are well suited for this purpose.

The catalyst which is required to carry out the process of this invention can be conveniently introduced into the polymerization mixture by injecting it into the recycling effluent. Preferably this is done after the effluent has been cooled to the required temperature. By this procedure polymerization initiates upon mixing of the two streams in the mixing jet and continues in the pipeline reactor. Premature polymerization in the feed stream is thereby eliminated and an efficient catalyst utilization is insured.

As hereinabove indicated the polymerization mixture must contain small amounts of water to make the catalyst effective. Thus water acts as a cocatalyst in the process of this invention and anhydrous conditions must be avoided. Generally, a quantity in excess of 2 parts per million of water based on the monomer mixture can be used in the present process, but an amount of from about 2 to 100 ppm is preferred. Excess quantities of water, while not directly harmful, will result in greater catalyst consumption and thereby adversely effect the economics of the process. These indicated quantities of water required to carry out the process of this invention are usually present as an impurity in the monomers available in commercial quantities and it is therefore not necessary to separately incorporate water into the feed stream in most instances.

The primary catalyst for this process selected from the group consisting of boron trifluoride, aluminum chloride, ethyl aluminum dichloride, diethyl aluminum chloride and mixtures thereof can be incorporated into the feed stream or preferably the recycling reactor effluent as such or as a solution in an inert solvent such as heptane or in the case of aluminum chloride, which is insoluble in such solvents, in the form of a slurry in mineral oil and the like. Generally an amount of from about 0.05 to about 2.0 percent by weight based on alpha-methylstyrene of catalyst can be used. Thus, the ratio of water to primary catalyst which can be generally used in the present process ranges from about 1:1,000 to about 1:2 by weight, while the preferred ratio ranges from about 1:400 to about 1:50 by weight.

To start the continuous process of this invention wherein a portion of the reactor effluent is used as a diluent for the monomer feed stream, the pipeline reactor and recycling line including the level control vessel and heat exchanger can be filled with inert organic solvent. The solvent is then recycled thereby cooling it to the operating temperature, precooled monomer solution is pumped into the mixing jet and catalyst is injected into the recycling stream. Thereafter the rates of monomer feed and recycling effluent are adjusted to within the desired limits to produce an alpha-methylstyrene vinyltoluene copolymer having a specific range of properties.

The portion of reactor effluent which is not recycled for the purpose of adjusting the monomer concentration is sent to the catalyst removal equipment and the stripping tower to recover the desired product. The catalyst can be removed from the polymerization products by washing the polymer solution with aqueous alkali such as a slurry of water and lime or alkaline earth metal hydroxide or carbonates. The catalyst can also be removed by passing the polymerization product through a bed of activated clays such as fuller's earth, particularly when boron trifluoride is used as the catalyst.

The process of the present invention is more specifically illustrated in the following examples.

EXAMPLE 1

70 parts by weight of alpha-methylstyrene and 30 parts of vinyltoluene are mixed with toluene to provide a solution having a monomer concentration of about 10 percent. This monomer solution is then cooled to a temperature of about −25° C by indirect heat exchange and is passed through a pipeline reactor having a 2 inch diameter and a length of 60 feet at a rate of about 15 gallons per minute. Boron trifluoride catalyst is simultaneously added to the pipeline reactor in a concentration of 0.4 percent based on the weight of monomers in the solution. The effluent of the reactor is then neutralized using an aqueous slurry of lime, is filtered and is stripped of toluene to yield an alpha-methylstyrene vinyltoluene resin in accordance with this invention.

EXAMPLE 2

90 parts by weight of alpha-methylstyrene and 10 parts by weight of vinyltoluene are mixed with toluene to provide a solution having a monomer concentration of about 6 percent. This monomer solution is then cooled to a temperature of about −40° C by indirect heat exchange and is passed through a 60 foot long pipeline reactor having a 2 inch diameter at a rate of about 15 gallons per minute. Boron trifluoride catalyst is simultaneously added to the pipeline reactor in a concentration of 0.4 weight percent based on the monomers in the solution. The effluent of the reactor is then neutralized using an aqueous slurry of lime, is filtered and stripped of toluene to yield an alpha-methylstyrene vinyltoluene resin of this invention.

EXAMPLE 3

50 parts by weight of alpha-methylstyrene and 50 parts by weight of vinyltoluene are mixed with toluene to provide a solution having a monomer concentration of about 20 percent. This monomer solution is cooled to a temperature of about −50° C by indirect heat exchange and is passed through a 60 foot long pipeline reactor having a 2 inch diameter at a rate of about 15 gallons per minute. Boron trifluoride catalyst is simultaneously added to the pipeline reactor in a concentration of 0.4 percent based on monomers in the solution. The effluent from the reactor is then neutralized using an aqueous slurry of lime, is filtered and stripped of toluene to yield a resin of this invention.

EXAMPLE 4

A pipeline reactor equipped with a mixing jet at its entry port and a recycling line from the exit port of the reactor to the mixing jet whereby any portion of the reactor effluent can be cooled and recycled back into the mixing jet is filled with toluene. The toluene is recycled and is cooled to a temperature of about −50° C. A monomer mixture containing 70 weight percent alpha-methylstyrene and 30 weight percent vinyltoluene and containing about 2 ppm of water is mixed with toluene to provide a solution containing about 50 percent by weight of the monomers. The monomer solution is cooled to a temperature of about −50° C and is pumped into the mixing jet. Boron trifluoride is simultaneously added to the recycling reactor effluent at a rate of about 0.05 percent by weight based on the monomers in the feed stream and the recycling rate of the effluent is adjusted such that the alpha-methylstyrene concentration in the feed stream entering the pipeline reactor is about 5 percent. That portion of the reactor effluent which is not recycled is neutralized with an aqueous slurry of lime and is stripped of toluene to yield the desired alpha-methylstyrene vinyltoluene resin.

EXAMPLE 5

A pipeline reactor equipped with a mixing jet at its entry port and a recycling line from the exit port of the reactor to the mixing jet whereby any portion of the reactor effluent can be cooled and recycled back into the mixing jet is filled with xylene. The xylene is recycled and cooled to a temperature of about 0° C. A monomer mixture containing 70 weight percent alpha-methylstyrene and 30 weight percent vinyltoluene and containing about 100 ppm of water is mixed with sufficient xylene to provide a solution containing about 40 percent by weight of the monomers. The monomer solution is cooled to a temperature of about 0° C and is pumped into the mixing jet. A solution of ethyl aluminum dichloride in xylene is simultaneously added to the recycling effluent at a rate of about 2 percent by weight based on the monomers in the feed stream and the recycling rate of the effluent is adjusted such that the monomer concentration in the feed stream entering the pipeline reactor is about 5 percent. The rate of the entire feed stream is then adjusted such that the reaction mixture has a residence time of about 15 seconds in the pipeline reactor. The reactor effluent which is not recycled is then filtered and stripped of xylene under reduced pressure to yield the desired alpha-methylstyrene vinyltoluene resin.

EXAMPLE 6

A pipeline reactor equipped with a mixing jet at its entry port and a recycling line from the exit port of the reactor to the mixing jet whereby any portion of the reactor effluent can be cooled and recycled back into the mixing jet is filled with cumene. The cumene is recycled and is cooled to a temperature of about −30° C. A monomer mixture containing 70 weight percent of alpha-methylstyrene and 30 weight percent vinyltoluene and containing about 50 ppm of water is mixed with a sufficient amount of cumene to provide a solution containing about 45 percent by weight of the monomers. The monomer solution is cooled to a temperature of about −30° C and is pumped into the mixing jet. A solution of diethyl aluminum chloride in cumene is simultaneously added to the recycling effluent at a rate of about 0.1 percent by weight based on the monomers in the feed stream and the recycling rate of the effluent is adjusted such that the monomer concentration in the feed stream entering the pipeline reactor is about 15 percent. The rate of the entire feed stream is then adjusted such that the reaction mixture has a residence time of about 1 minute in the pipeline reactor. The reactor effluent which is not recycled is then passed through a bed of fuller's earth and is stripped of cumene under reduced pressure to yield the desired alpha-methylstyrene vinyltoluene resin.

EXAMPLE 7

A pipeline reactor equipped with a mixing jet at its entry port and a recycling line from the exit port of the reactor to the mixing jet whereby any portion of the reactor effluent can be cooled and recycled back into the mixing jet is filled with xylene. The xylene is recycled and is cooled to a temperature of about −20° C. A monomer mixture containing 65 weight percent alpha-methylstyrene and 35 weight percent vinyltoluene and containing about 200 ppm of water is mixed with a sufficient amount of xylene to provide a solution containing about 30 percent by weight of the monomers. The monomer solution is cooled to a temperature of about −20° C and is pumped into the mixing jet. A solution of ethyl aluminum sesquichloride (an equal mixture of ethyl aluminum dichloride and diethyl aluminum chloride) in xylene is simultaneously added to the recycling effluent at a rate of about 0.5 percent by weight based on the monomers in the feed stream. The recycling rate of the effluent is adjusted such that the monomer concentration in the feed stream entering the pipeline reactor is about 8 percent. The rate of the entire feed stream is then adjusted such that the reaction mixture has a residence time of about 1 minute in the pipeline reactor. The reactor effluent which is not recycled is then mixed with 30 weight percent methanol based on the copolymer, extracted with water and is stripped of xylene under reduced pressure to yield the resin of this invention.

The process of the present invention can also be effected in a batch type process providing that the reaction conditions and parameters described for the continuous process are met. The batch process can be carried out by charging the monomer mixture at the required ratio and dissolved in an inert solvent at a concentration of from about 5 to about 20 percent by weight into a suitable reaction vessel equipped with stirring and cooling means. A nitrogen atmosphere is then provided over the monomer solution and the solution is then precooled to the required temperature. The Friedel-Crafts catalyst is then added to the monomer solution and the resulting mixture is stirred under adiabatic conditions for a period sufficient to ensure complete reaction. After this time the polymerization product can be neutralized and stripped of solvent to yield the desired product. This procedure is more specifically illustrated in the following example.

EXAMPLE 8

A 5-liter, 3-necked flask is equipped with a gas inlet tube extending to the bottom of the flask, a stirrer, thermometer and an adapter connected to a nitrogen line. The reaction flask is charged with alpha-methylstyrene (332 grams) vinyltoluene (135 grams) and toluene (2533 grams). The reaction mixture is degassed for five minutes by bubbling nitrogen gas through the gas inlet tube. The reaction mixture is then cooled to −40° C with a dry-ice acetone bath and the cooling bath is removed. Catalyst, boron trifluoride gas (1,400 cc; 0.93 percent based on monomers), is introduced into the reaction flask through the gas inlet tube over a three minute period. The reaction mixture is then stirred for an hour and neutralized with Florex clay (70 grams). The reaction mixture is then filtered and the filtrate is stripped of solvent and low boiling oligomers at a temperature of 250° C at 0.2 mm of Hg pressure to yield the desired resin.

A variety of resins in accordance with the instant invention were prepared by the general procedure detailed in Example 8. The various reaction conditions, the composition and the properties of the resulting copolymers are set forth in Table I. In each instance the reaction was carried out in toluene at a monomer concentration of 15 percent by weight.

ring and ball softening point from about 275° to about 350° F.

The aromatic hydrocarbon solvent used in the printing inks of this invention can be any aromatic solvent capable of dissolving the resin. For example, benzene, toluene, xylene, ethyl benzene and the like can be used. The pigments which can be utilized in the printing ink are any of the various pigments such as titanium dioxide, carbon black as well as colored pigments typically used in the printing industry.

In some instances it is desirable to incorporate thickening agents into the printing ink in order to obtain a particular viscosity. Ethyl cellulose in combination with small amounts of ethanol to aid dissolution can be used for this purpose. Other useful thickening agents are ethyl cellulose and derivatives thereof, methyl cellulose, castor oil derivatives such as Thixcin (a product of Baker Castor Oil Co.), bentonites and silicas such as Cab-O-Sil (a product of Cabot Corp.).

The printing ink of this invention can be readily prepared by combining the various constituents in a ball mill and milling the mixture until the desired degree of dispersion is obtained. Exemplary printing ink compositions are illustrated in the following examples wherein the numerical values are parts by weight.

EXAMPLE 9

Black Rotogravure Printing Ink

| | |
|---|---|
| Resin of this invention | 6 |
| Ethyl cellulose | 6 |
| Ethanol | 8 |
| Carbon black | 6 |
| Toluene | 75 |

TABLE I

| Resin Number | Weight Ratio of α-Methylstyrene to Vinyltoluene | BF₃ Catalyst Weight Percent on Monomers | Initial Reacting Temp.°C | Resin Yield Wt. Percent on Monomers | Resin Softening Point °F. | Molecular Wt. No. Average |
|---|---|---|---|---|---|---|
| 1 | 80:20 | 1.60 | −40 | 99.5 | 345 | 2394 |
| 2 | 75:25 | 1.20 | −40 | 99.5 | 348 | 2700 |
| 3 | 70:30 | 1.20 | −40 | 100.5 | 341 | 2569 |
| 4 | 65:35 | 1.20 | −40 | 100.5 | 342 | 2723 |
| 5 | 60:40 | 0.93 | −40 | 100.5 | 335 | 2771 |
| 6 | 70:30 | 1.06 | −40 | 99.2 | 350 | 2529 |
| 7 | 70:30 | 0.93 | −30 | 98.5 | 325 | 2212 |
| 8 | 70:30 | 0.93 | −20 | 97.5 | 285 | 1659 |
| 9 | 80:20 | 0.93 | −20 | 95.3 | 290 | 1635 |
| 10 | 60:40 | 0.93 | −20 | 98.3 | 282 | 1873 |

As previously indicated the resins of the present invention are useful for preparing printing inks. The resins are particularly useful as binders for rotogravure printing inks.

Thus, a further embodiment of the present invention resides in a printing ink comprising from about 5 to about 40 weight percent of the resin of this invention, from about 40 to about 90 weight percent of an aromatic hydrocarbon solvent, and from about 1 to about 50 weight percent pigment.

For the purpose of preparing printing inks it is preferred to use a resin comprising from about 60 to about 80 weight percent alpha-methylstyrene and from about 20 to about 40 weight percent vinyltoluene having a

EXAMPLE 10

White Rotogravure Printing Ink

| | |
|---|---|
| Resin of this invention | 25 |
| Titanium dioxide | 35 |
| Toluene | 40 |

EXAMPLE 11

| | |
|---|---|
| Resin of this invention | 9 |
| Phthalocyanine blue | 1 |
| Xylene | 90 |

EXAMPLE 12

| | |
|---|---|
| Resin of this invention | 40 |
| Carbon black | 6 |
| Benzene | |

Printing inks of each of the resins described in Table I were prepared in accordance with the formulation given in Example 9. The properties of those inks were determined and are set forth in Table II. The hiding power, adhesion and scratch resistance were rated on a scale wherein A = excellent, B = good, C = average, D = poor and F = failed.

the inked paper stick together the blocking test is deemed passed.

The scratch resistance was determined by applying ink to a cellophane substrate with a hand brayer and allowing it to dry for a period of 1 hour. After this time the hardness of the film is evaluated by scratching the surface with a finger nail.

The rub resistance was determined by placing a 3 by 9 inch section of inked bond paper in the sample pan of a Garnder Straight Line Abrasion Tester which has been lined with bond paper. The inked paper is attached to the lining of the test pan with cellophane tape. A wooden block covered with the same paper

TABLE II

| Copolymer Number | 1 | 2 | 3 | 4 | 5 | 6 | 7 | 8 | 9 | 10 |
|---|---|---|---|---|---|---|---|---|---|---|
| Grind Rating (N.S.) | 7 | 7 | 7 | 7 | 7 | 7 | 7 | 7 | 7 | 7 |
| Hiding Power | B− | C− | B | C+ | C | C | C | C+ | C+ | C+ |
| Blocking | Pass | Pass | Pass | Pass | Pass | Pass | Pass | Pass | Pass | Pass |
| Adhsion: | | | | | | | | | | |
| Paper | C+ | D | C+ | D+ | B | B+ | C+ | B | D+ | C+ |
| Polyethylene | F | F | F | F | F | F | F | F | F | F |
| Cellophane | F | F | F | F | F | F | F | F+ | F+ | F |
| Steel | A− | A | A | A | A | A | A | A | A | A |
| Scratch Resistance | C+ | C+ | C+ | B | B | A− | C | A− | C | B+ |
| Rub Resistance | C− | C | B | C− | D | B+ | A+ | A− | A | C+ |

The grind rating was determined on a standard Hegman gauge and is expressed in terms of northern standard grind. The hiding power was determined by visual observation. The adhesion was determined by first drawing down 0.5 mil films of the inks on the various substrates. A one-half by six inch section of cellophane adhesive tape is then pressed firmly over the inked area. The tape is pulled off at an angle of about 160°. The first 3 inch section is pulled off slowly and the last 3 inch section is pulled off rapidly. The quality of adhesion is then determined by the amount of ink removed from the substrate by the tape.

The blocking properties of the inks were determined by folding a 1 by 4 inch section of inked paper so as to provide face to face, back to face and back to back contacts. The folded paper is placed between two steel panels and three 1-kilogram weights are placed on top of the panels. The weighted panels are then placed into a holding room at 140° F and 40 percent relative humidity for a period of 16 hours. If none of the folds of stock upon which the test ink was applied is used as a rubbing foot. The rubbing foot is then permitted to slide back and forth across the surface of the prepared sheet. The rub resistance is then evaluated by examining the sheet on the rubbing foot, the prepared test sheet and the pan lining sheet where the rubbing sheet has come in contact with it at each end of the test sheet.

The binodal characteristic and the varying monomer ratio of the higher and lower molecular weight fraction of the resins of this invention was demonstrated in an experiment wherein resin number 3 from Table I was fractionated by fractional precipitation from benzene methanol mixtures. The weight percent, number average molecular weight and monomer ratio of each fraction are shown in Table III. For comparative purposes a commercial alpha-methylstyrene vinyltoluene resin (Piccotex 120, a product of Pennsylvania Industrial Company) was also fractionated under the same conditions and the properties of the fractions are shown in Table III. For the sake of brevity alpha-methylstyrene is referred to as AMS and vinyltoluene as VT.

TABLE III

| | | Resin number 3 | | | | Commercial AMS/VT resin | | | |
|---|---|---|---|---|---|---|---|---|---|
| | Fractionation solvents benzene/ methanol weight ratio (g.) | Isolated resin weight (g.) | Wt. percent of total sample (normalized) | Number average molecular wt. | Infrared analysis AMS/VT wt. percent (normalized) | Isolated resin weight (g.) | Wt. percent of total sample (normalized) | Number average molecular wt. | Infrared analysis AMS/VT wt. percent (normalized) |
| Fraction 1 (insoluble) | 540/450 | 5.04 | 53.1 | 6762 | 80.1 / 19.9 | 0.72 | 7.1 | 4086 | 26.1 / 73.9 |
| Fraction 2 (insoluble) | 540/950 | 0.75 | .79 | 3318 | 66.4 / 33.6 | 4.34 | 42.5 | 3552 | 24.8 / 75.2 |
| Fraction 3 (soluble) | 540/950 | 3.70 | 39.0 | 1144 | 51.9 / 48.1 | 5.12 | 54.4 | 1348 | 28.4 / 71.6 |
| Initial sample | − | 10.0 | 100 | 2403 | 68.4 / 31.7 | 10.0 | 100 | 1907 | 26.7 / 73.3 |

I claim:

1. A thermoplastic hydrocarbon resin having a ring and ball softening point of from about 275° to 350° F and a number average molecular weight of from about 1,500 to about 3,000 comprising alpha-methylstyrene and vinyltoluene copolymers wherein about 45 to 60 weight percent of said resin consists of a copolymer having an alpha-methylstyrene to vinyltoluene weight ratio of from about 70:30 to about 90:10 and a number average molecular weight above about 4000 wherein about 30 to 60 weight percent of said resin consists of a copolymer having an alpha-methylstyrene to vinyltoluene weight ratio of from about 40:60 to about 60:40 and a number average molecular weight below about 2,000 and wherein the total resin contains from about 50 to about 90 weight percent alpha-methylstyrene and from about 10 to about 50 weight percent vinyltoluene.

2. A process for the production of the resin of claim 1 which comprises polymerizing a monomer mixture containing from about 50 to about 90 weight percent alpha-methylstyrene and from about 10 to about 50 weight percent vinyltoluene dissolved in an inert organic reaction medium at a concentration of from about 5 to about 20 weight percent, which has been precooled to a temperature between about 0° and about −50° C, in the presence of a catalytic amount of water and a Friedel-Crafts halide at atmospheric pressure and adiabatic conditions.

3. The process of claim 2 wherein the inert organic reaction medium is an aromatic hydrocarbon solvent.

4. The process of claim 2 which comprises continuously polymerizing the monomer mixture.

5. The process of claim 4 wherein at least 45 percent by weight of the inert organic reaction medium consists of recycled polymerized alpha-methylstyrene vinyltoluene copolymer solution.

6. The process of claim 4 wherein the Friedel-Crafts halide is selected from the group consisting of boron trifluoride, aluminum chloride, ethyl aluminum dichloride, diethyl aluminum chloride and mixtures thereof.

7. The process of claim 4 which comprises continuously polymerizing a monomer mixture containing from about 50 to about 90 weight percent alpha-methylstyrene and from about 10 to about 50 weight percent vinyltoluene dissolved in an aromatic hydrocarbon solvent at a concentration of from about 5 to about 20 weight percent which has been precooled to a temperature between about 0° and about −50°C in the presence of from about 0.05 to about 1.0 percent by weight based on alpha-methylstyrene and vinyltoluene monomer mixture of a Friedel-Crafts halide selected from the group consisting of boron trifluoride, aluminum chloride, ethyl aluminum dichloride, diethyl aluminum chloride and mixtures thereof, and from about 2 to about 100 ppm of water based on the alpha-methylstyrene and vinyltoluene monomer mixture at atmospheric pressure and adiabatic conditions.

8. The process of claim 5 which comprises
a. cooling a feed stream comprising a monomer mixture consisting of from about 50 to about 90 weight percent alpha-methylstyrene and about 10 to about 50 weight percent vinyltoluene dissolved in an aromatic hydrocarbon solvent at a concentration of from about 30 to about 60 weight percent and from about 2 to about 100 ppm of water based on the monomer mixture to a temperature of between about 0° to about −50° C,
b. continuously flowing said feed stream through a mixing jet into a pipeline reactor and polymerizing the monomer mixture at atmospheric pressure and adiabatic conditions and
c. recycling a sufficient amount of the effluent from the pipeline reactor after cooling it to a temperature ranging from about 0° C to about −50° C to the mixing chamber such that the alpha-methylstyrene vinyltoluene monomer concentration in the mixture entering the pipeline reactor ranges between about 5 and about 20 percent by weight of the total mixture while simultaneously adding a catalyst selected from the group consisting of boron trifluoride, aluminum chloride, ethyl aluminum dichloride, diethyl aluminum chloride and mixtures thereof to the recycling effluent in an amount of from about 0.05 to about 2.0 percent by weight based on the monomer mixture in the feed stream.

9. The process of claim 8 wherein the aromatic hydrocarbon solvent is selected from the group consisting of toluene, xylene and cumene.

10. The process of claim 8 wherein the catalyst is boron trifluoride.

11. The process of claim 8 wherein the monomer mixture contains about 70 weight percent alpha-methylstyrene and about 30 weight percent vinyltoluene.

12. A printing ink comprising from about 5 to about 40 weight percent of the resin of claim 1, from about 40 to about 90 weight percent of an aromatic hydrocarbon solvent, and from about 1 to about 50 weight percent pigment.

* * * * *